US012618463B2

(12) United States Patent
Greiter

(10) Patent No.: US 12,618,463 B2
(45) Date of Patent: May 5, 2026

(54) MOTOR UNIT HAVING A LUBRICANT CIRCUIT

(71) Applicant: AUDI AG, Ingolstadt (DE)

(72) Inventor: Ivo Greiter, Eitensheim (DE)

(73) Assignee: AUDI AG, Ingolstadt (DE)

( * ) Notice: Subject to any disclaimer, the term of this patent is extended or adjusted under 35 U.S.C. 154(b) by 70 days.

(21) Appl. No.: 18/354,420

(22) Filed: Jul. 18, 2023

(65) Prior Publication Data

US 2024/0026968 A1 Jan. 25, 2024

(30) Foreign Application Priority Data

Jul. 19, 2022 (DE) .......................... 102022117957.5

(51) Int. Cl.
*F16H 57/04* (2010.01)
*F16H 57/02* (2012.01)

(52) U.S. Cl.
CPC ..... *F16H 57/0476* (2013.01); *F16H 57/0415* (2013.01); *F16H 57/042* (2013.01); *F16H 57/0436* (2013.01); *F16H 57/0443* (2013.01); *F16H 57/045* (2013.01); *F16H 57/0457* (2013.01); *F16H 2057/02034* (2013.01); *F16H 2057/02052* (2013.01)

(58) Field of Classification Search
CPC .................. F16H 2057/02034; F16H 57/0476
See application file for complete search history.

(56) References Cited

U.S. PATENT DOCUMENTS

| | | | | |
|---|---|---|---|---|
| 10,865,873 | B2 * | 12/2020 | Ishikawa | F16H 57/0476 |
| 11,231,103 | B2 * | 1/2022 | Staake | F16H 57/0441 |
| 12,098,766 | B2 * | 9/2024 | Greiter | F16H 57/0445 |
| 2004/0134693 | A1 * | 7/2004 | Yamagishi | H02K 7/116 |
| | | | | 180/65.1 |
| 2019/0120369 | A1 * | 4/2019 | Staake | F16H 57/045 |
| 2019/0186622 | A1 * | 6/2019 | Ishikawa | H02K 7/083 |
| 2021/0039491 | A1 * | 2/2021 | Merz | F16H 57/04 |
| 2022/0042591 | A1 * | 2/2022 | Yu | F16H 57/0471 |
| 2023/0341044 | A1 * | 10/2023 | Greiter | F16H 57/045 |
| 2023/0344312 | A1 * | 10/2023 | Greiter | H02K 7/006 |
| 2024/0026968 | A1 * | 1/2024 | Greiter | F16H 57/0457 |

(Continued)

FOREIGN PATENT DOCUMENTS

| | | |
|---|---|---|
| DE | 102010062952 A1 | 6/2012 |
| DE | 102014205881 B3 | 6/2015 |

(Continued)

OTHER PUBLICATIONS

DE 102019128957—Machine Translation.*

*Primary Examiner* — Michael A Riegelman
(74) *Attorney, Agent, or Firm* — Seed Intellectual Property Law Group LLP

(57) ABSTRACT

A motor unit is provided having an electric motor and a transmission, which are mechanically joined together and arranged in a housing, wherein the motor unit comprises a lubricant circuit, which lubricates the electric motor and the transmission, wherein a lubricant pump is provided, having an outlet and at least two inlets for lubricant. Furthermore, a lubricant sump is provided, which is arranged beneath the electric motor and/or the transmission in the housing during use, having at least two suction points. A method is also provided for the circulation of lubricant in a motor unit.

8 Claims, 1 Drawing Sheet

(56)            References Cited

U.S. PATENT DOCUMENTS

2024/0146155 A1*   5/2024   Greiter .................. H02K 9/197
2024/0328502 A1*  10/2024   Satoda ................ F16H 57/0471
2024/0333102 A1*  10/2024   Weber ................... H02K 7/116
2024/0333104 A1*  10/2024   Greiter .................. H02K 9/193

FOREIGN PATENT DOCUMENTS

DE       102016211226  B3     6/2017
DE       102019128957  A1     4/2021
EP            3798429  A1     3/2021
JP          2014000848  A     1/2014

* cited by examiner

MOTOR UNIT HAVING A LUBRICANT CIRCUIT

BACKGROUND

Technical Field

The present disclosure relates to a motor unit having an electric motor and a transmission, which are mechanically joined together and arranged in a housing, wherein the motor unit comprises a lubricant circuit, which lubricates the electric motor and the transmission, wherein a lubricant pump is provided, having an outlet and at least two inlets for lubricant. Furthermore, a lubricant sump is provided, which is arranged beneath the electric motor or the transmission in the housing during use, having at least two suction points. The disclosure also relates to a method for the circulation of lubricant in a motor unit.

Description of the Related Art

Motor units, which comprise an electric motor and a transmission connected to it in a common housing, are used, for example, as axle drives for motor vehicles. For such motor units it is basically required that the electric motor and the transmission must be both lubricated and cooled, in order to assure long-term operating safety. In order to assure this operating safety in all load situations, a dry sump lubrication can be used, for example, in which lubricant is suctioned out from the transmission and the electric motor and stored in a lubricant tank. Then, from this lubricant tank, the lubricant is taken at different pressure levels on the one hand to the transmission and on the other hand to the electric motor. This concept achieves a reliable lubrication of all components in all load situations, but it is expensive and it requires a multitude of components.

The document JP2014000848A describes a cooling system for the electric motor of a hybrid vehicle. This cooling system comprises two lubricant pumps, one of which is driven mechanically by an internal combustion engine and the other electrically. The lubricant is stored in a lubricant sump and can be suctioned out by both oil pumps and taken to the electric motor.

In the document DE 10 2014 205 881 B3 there is described a transmission motor having an electric motor, where a transmission is arranged inside the rotor of the electric motor. The lubricant circuit for the transmission motor comprises two lubricant pumps, one of which pumps the lubricant to a lubricant tank situated outside the transmission motor and the other lubricant pump takes the lubricant stored there temporarily back to the transmission motor.

The document DE 10 2010 062 952 A1 discloses a transmission for off-road vehicles. Inside the transmission housing there is arranged a lubricant tank. The lubricant circuit is configured such that lubricant from a dry sump is at first pumped to the lubricant tank and taken from this lubricant tank to the components being lubricated. The lubricant circuit comprises at least two lubricant pumps.

BRIEF SUMMARY

Embodiments of the disclosure propose solutions with which the lubricant supply of a motor unit having an electric motor and a transmission can be simplified and the number of components required for the lubricant supply can be reduced.

Some embodiments include a motor unit having an electric motor and a transmission, which are mechanically joined together and arranged in a housing, wherein the motor unit comprises a lubricant circuit, which lubricates the electric motor and the transmission, wherein a lubricant pump is provided, having an outlet and at least two inlets for lubricant, wherein the outlet is connected by conduits to the electric motor and the transmission, a lubricant sump is provided, which is arranged beneath the electric motor or the transmission in the housing during use, and having at least two suction points separated from each other in the horizontal direction, and each of the suction points is connected by a conduit to an inlet of the lubricant pump.

The motor unit described herein comprises a housing, inside which are arranged an electric motor and a transmission. The housing may comprise multiple chambers, preferably having passages between each other, through which air and lubricant can get from one chamber to another chamber. The motor unit comprises a lubricant circuit, which supplies both the electric motor and the transmission with lubricant. In some embodiments, the lubricant is a lubricating oil. The lubricant serves here primarily for the lubrication of moving components, but it can also be used for cooling of the electric motor and/or the transmission. The motor unit comprises only a single lubricant pump, having an outlet from which lubricant is pumped through one or more conduits to the transmission and to the electric motor. The lubricant pump has at least two inlets, by which lubricant is sucked in from the lubricant sump.

A lubricant sump is arranged during use beneath the electric motor and/or beneath the transmission within the housing. By the term "during use" is meant a situation in which the motor unit is in the normal operating state. By "normal operating state" is meant, in turn, a state in which the motor unit is being used as intended. For example, if the motor unit is installed in a motor vehicle, then the term "during use" means a normal movement of the vehicle as intended. In this use case, the lubricant sump is beneath the electric motor or the transmission in the vertical direction. Thanks to placing the lubricant sump beneath the electric motor and/or transmission, the lubricant will collect automatically by gravity in the lubricant sump.

The lubricant sump forms a reservoir for the lubricant, and no additional lubricant tank is provided. The lubricant sump has two suction points spaced apart from each other in the horizontal direction, representing the locations where the lubricant pump sucks lubricant out from the lubricant sump. For this, each of the suction points is connected by its own conduit to one of the two inlets of the lubricant pump. In many operating states of the motor unit belonging to the use case it may happen that the viscous lubricant is moving in the lubricant sump, and in such a state the lubricant does not cover the entire bottom surface of the lubricant sump. For example, during an intense acceleration of a vehicle in which the motor unit is installed, the lubricant might move backward in the travel direction and collect there by the force of the transverse acceleration.

In some embodiments, two suction points spaced apart are provided, in order to assure in every operating state of the use case that lubricant is present at least at one suction point and can be sucked in by the lubricant pump. In this way, it is ensured that lubricant is always delivered by the lubricant pump and the lubrication functions reliably in all operating states. Thanks to providing two suction points spaced apart from each other in the horizontal direction, the lubricant sump can have a compact design and in particular a low height in the vertical direction. In this way, the required design space for the lubricant sump and therefore, also for the motor unit, is significantly reduced as compared to the prior art. At the same time, the motor unit described herein has only one lubricant pump, which simplifies the lubricant circuit and reduces the number of required components as compared to the prior art.

In one embodiment it is provided that the lubricant sump is situated beneath the electric motor during use and a lubricant shell is arranged beneath the transmission during use, being provided to catch the lubricant from the transmission, and the transmission comprises at least one transmission gear, which dips partly into the lubricant caught in the lubricant shell, this transmission gear delivering lubricant from the lubricant shell to the lubricant sump during use. In this embodiment, a lubricant shell beneath the transmission collects lubricant which has previously lubricated the transmission. The transporting of the collected lubricant from the lubricant shell to the lubricant sump is done by at least one transmission gear, which dips partly into the lubricant and delivers it by its rotary motion to the lubricant sump. The transmission gear during use rotates in order to convert a rotary motion of the electric motor into a rotary motion of a power takeoff shaft of the motor unit. This rotary motion is used at the same time for the delivery and movement of the lubricant inside the housing. In this way, no pump is required for the delivery of the lubricant. Furthermore, it is not necessary to provide an additional suction point on the lubricant shell beneath the transmission for the suctioning of lubricant by the lubricant pump. In this way, the motor unit is given a simple design with a reduced number of components as compared to the prior art. Of course, it is also possible to arrange the lubricant sump beneath the transmission and a lubricant shell beneath the electric motor, in which case a delivery gear can be arranged on the shaft of the electric motor, delivering lubricant from the electric motor to the transmission in this alternative embodiment.

In another embodiment it is provided that at least one lubricant guiding element is provided in the housing adjacent to the transmission gear, guiding the lubricant flow from the transmission gear to the lubricant sump. Such a lubricant guiding element serves for taking the lubricant flow from the lubricant shell to the lubricant sump. The lubricant guiding element can be formed by a partial region of the inner wall of the housing or by a component which is mounted afterwards on the inside of the housing, such as a baffle plate. In some embodiments, multiple lubricant guiding elements are provided to guide the lubricant flow.

In some embodiments, it is provided that the lubricant pump comprises an electric drive and is situated inside or outside the housing. An electric drive of the lubricant pump enables a regulation of the lubricant pump independently of the rotational speed of the electric motor or the transmission. The lubricant pump may be arranged at various locations. An arrangement inside the housing is space-saving in terms of design space, while an arrangement outside the housing enables easier access to the lubricant pump, for example, for servicing work.

In one embodiment it is provided that the lubricant pump may be configured as an external gear pump, in which two gears are provided, each of which suctions lubricant from one of the two inlets, or the lubricant pump is configured as a vane pump, wherein the vane pump comprises two suction openings which are staggered by 180° with respect to each other in the circumferential direction, each of which forms one inlet of the lubricant pump. Basically, all pump types having two inlets and one outlet are suitable for the motor unit. Such a functional principle may be implemented by an external gear pump, which has a simple and robust design. A common drive, such as an electric drive, actuates two gears, each one being connected to one of the two inlets and sucking in the lubricant. In many operating states it may happen that only one inlet is taking in lubricant, while the other inlet is taking in air. In some embodiments, it can be provided that the lubricant pump has an air vent at the pressure side, that is, at the outlet. A vane pump may also be used as the lubricant pump, in particular, this can be divided into two partial pumps operating through 180°, each of them being connected to a suction point and having a common drive.

In some embodiments, it is provided that the lubricant sump has larger dimensions during use in the horizontal direction than in the vertical direction, in particular, wherein the length and the width of the lubricant sump in the horizontal direction is larger by at least a factor of 8 than the height in the vertical direction, and the suction points are situated respectively in the horizontal direction at a distance from the outer edge of the lubricant sump corresponding to as much as 20% of the distance between two opposite outer edges in the horizontal direction. The lubricant sump has a low design, in order to occupy the least possible design space. Such a low form is achieved in that the width and length of the lubricant sump in the horizontal direction is greater, for example, by at least a factor of eight, than the height running in the vertical direction. In this way, the lubricant sump may be arranged in space-saving manner beneath the electric motor, without significantly increasing the required design space for the entire housing. Because of the low design, the lubricant during use is moved by transverse accelerations in the horizontal direction.

In order to avoid the lubricant pump not taking in any lubricant, at least two suction points are provided, being situated at a spacing from each other in the horizontal direction. Thus, when the lubricant is moving in the lubricant sump, lubricant will always be present at least at one suction point. The suction points are situated in the vicinity of opposite outer edges. In a moving vehicle in which the motor unit is installed, transverse accelerations of up to 1 g typically occur, which act on the lubricant in the lubricant sump. It has been discovered that a transverse acceleration of 1 g acts in roughly the same manner on the lubricant as gravity during a static tilting of the motor unit by 45° to the horizontal. A transverse acceleration of 1 g thus has the effect that, when the lubricant sump is partly filled with lubricant, there will be no more lubricant present on one side in the horizontal direction, while on the opposite side lubricant will collect. Thanks to the described positioning of two suction points spaced apart from each other, and situated in the vicinity of one edge of the lubricant sump, a continual stable supply of lubricant to the motor unit is always assured under ordinary transverse accelerations. In a case where even stronger transverse accelerations are expected, such as competitive racing, or in a case where larger static inclinations are expected, such as in the case of off-road vehicles or working machinery, even more than two suction points may be provided of course at different positions in the lubricant sump, spaced apart from each other.

In some embodiments, it is provided that a heat exchanger is arranged between the lubricant pump and the transmission and/or spray rings delivering lubricant to the electric motor are arranged next to the electric motor in the housing. In one embodiment where the lubricant is used at the same time for cooling of the electric motor or the transmission, a heat exchanger may be arranged on the side with the outlet of the lubricant pump. Such a heat exchanger cools the lubricant before it is taken once more to the electric motor and the transmission. In order to assure a uniform distribution of the lubricant at the electric motor or in the electric motor, spray rings may be provided, which spray the lubricant finely distributed onto the electric motor. This embodiment is advisable in motor units with high performance.

In another embodiment it is provided that at least the electric motor has a coolant circuit different from the lubricant circuit. In this embodiment, some or all of the cooling of the electric motor is done by a coolant circuit independent of the lubricant circuit. In this way, the lubricant is heated less and it is usually not necessary to provide a heat exchanger in the lubricant circuit. The coolant circuit may comprise, for example, a cooling water jacket arranged in the wall of the housing, which is supplied with cooling water from outside the transmission.

Some embodiments comprise a method for the circulation of lubricant in a motor unit according to one of the previously described embodiments, involving the steps: A) suctioning of lubricant from the lubricant sump, wherein the lubricant is suctioned from both suction points or from only one suction point by the lubricant pump, wherein the number of suction points used depends on the transverse acceleration acting on the lubricant during use; B) transporting of the lubricant by the lubricant pump to the transmission and to the electric motor through conduits; and C) conducting of the lubricant by gravity and/or centrifugal force through the transmission and the electric motor, the lubricant being caught in the lubricant sump after it passes through.

The method described herein serves for a stable lubrication of electric motor and transmission of a motor unit in every operating state. The method is carried out making use of a motor unit according to one of the previously described embodiments, such as in the indicated sequence of steps A) to C). During the operation of the motor unit, the method is repeated continuously in order to assure an ongoing circulation of the lubricant.

In a first step A) of the method, lubricant is sucked in from the lubricant sump by the lubricant pump through two inlets. Thanks to the two suction points on or in the lubricant sump, it is assured that lubricant will be sucked up in every operating state. Transverse accelerations acting on the lubricant may cause the lubricant to be distributed unevenly in the lubricant sump and to be present, for example, only in a partial region of the lubricant sump in the horizontal direction. In each case, lubricant will be present at a suction point, so that the pump takes in lubricant at least through one inlet and accordingly can supply the transmission and the electric motor again through its outlet.

After being suctioned, in a second step B) the lubricant is transported by the lubricant pump to the transmission and electric motor. Multiple conduits are provided for this, leading from the outlet of the lubricant pump to the transmission and to the electric motor and delivering the lubricant there, especially in finely divided form.

In the third step C) of the method, the lubricant moves by gravity and/or by centrifugal force, which is introduced into the lubricant by moving parts in the motor unit, through the transmission and the electric motor. After this passage of the lubricant through the transmission and the electric motor, the lubricant is captured in the lubricant sump. As long as a lubricant shell is provided underneath the transmission, the lubricant will be delivered from this lubricant shell by a transmission gear to the lubricant sump.

The method described herein simplifies the lubricant supply of a motor unit, since only a small number of components are needed for the circulation of the lubricant in the motor unit. Thanks to this simplified design of the motor unit, the reliability and long-term stability of the motor unit and thus also that of the method for circulation of the lubricant are improved.

Features, effects and benefits which are disclosed in connection with the motor unit also count as being disclosed in connection with the method. The same holds, vice versa, for features, effects and benefits which are disclosed in connection with the method, which are also counted as being disclosed in connection with the motor unit.

BRIEF DESCRIPTION OF THE SEVERAL VIEWS OF THE DRAWINGS

Embodiments are represented schematically with the aid of the drawings and shall be further described with reference to the drawings.

DETAILED DESCRIPTION

Figure 1:
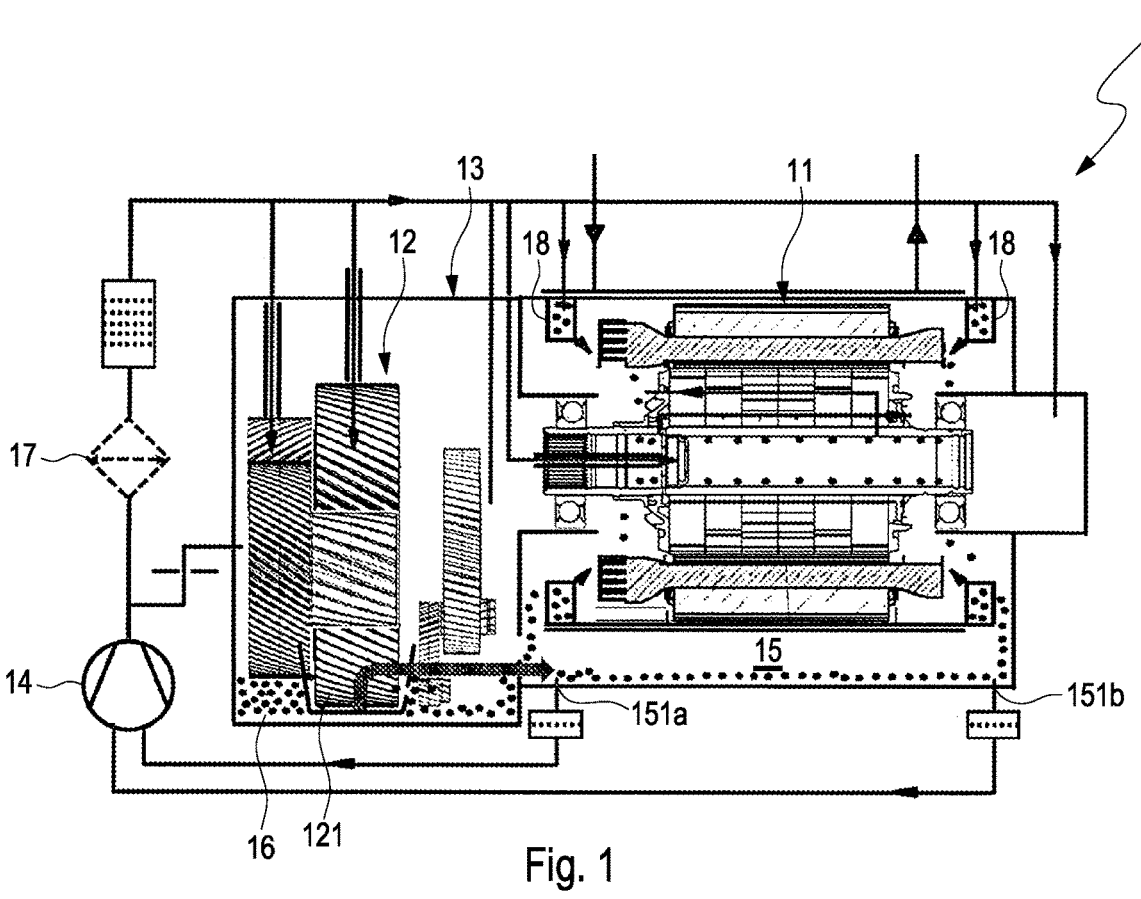
FIG. 1 shows in a schematic view, an embodiment of a motor unit described herein.

FIG. 1 shows in a schematic view an embodiment of a motor unit 1. In FIG. 1, the functional principle of a motor unit 1 is represented. At the left side, in the housing 13, multiple gears can be seen, symbolizing the transmission 12. At the right side in the housing 13 there is shown, partly sectioned, the electric motor 11. The electric motor 11 and the transmission 12 are mechanically connected to each other, although this is not represented. The rotor shaft of the electric motor 11 transfers a rotary motion to the transmission 12, which in turn puts out a rotary motion through a power takeoff shaft, not shown. A lubricant pump 14 in the embodiment shown is arranged outside the housing 13. The outlet of the lubricant pump 14 supplies through conduits both the transmission 12 and the electric motor 11 with lubricant. In one of the conduits there is arranged a heat exchanger 17, which serves for cooling down the lubricant supplied for the lubrication. In this way, the lubricant circuit can also be used for the cooling of the transmission 12 and/or the electric motor 11.

Directly adjacent to the electric motor 11 inside the housing 13 are arranged multiple spray rings 18, which spray the lubricant finely divided onto the electric motor 11. In this way, a uniform supply of lubricant to the electric motor 11 is assured. The spray rings 18 are connected by conduits to the outlet of the lubricant pump 14. Inside the housing, the lubricant moves, driven by gravity or a centrifugal force, downward through the transmission 12 and the electric motor 11. The lubricant is represented symbolically by a collection of dots. The lubricant gathers in a lubricant sump 15, which in the embodiment shown is arranged beneath the electric motor 11. The lubricant sump 15 serves for gathering and storing the lubricant inside the housing 13. The lubricant sump 15 is flat in configuration. The length and the width of the lubricant sump 15 in the horizontal direction are distinctly larger than its height in the vertical direction. In this way, the lubricant sump 15 can be integrated in a compact housing 13. The design space required for the overall motor unit 1 is thus small. Because the lubricant sump 15 is low and flat in configuration, it may happen in certain operating states that the lubricant in the lubricant sump 15 will be forced to one edge by transverse accelerations, while in another place, such as at the opposite edge, no lubricant is present.

For this reason, the lubricant sump 15 has at least two suction points 151a, 151b, which are arranged in the lower bottom surface and spaced apart from each other in the horizontal direction. These suction points 151a, 151b serve for the removal of the lubricant from the lubricant sump 15 and are connected each by a conduit to an inlet of the lubricant pump 14. The two suction points 151a, 151b are situated in the vicinity of two mutually opposite outer edges of the lubricant sump 15. In the embodiment shown, the suction point 151b is situated at a distance from the right-hand outer edge corresponding to around 10% of the distance between the two mutually opposite right and left outer edges in the horizontal direction Likewise, the suction point 151a is situated at a distance from the left-hand outer edge likewise corresponding to around 10% of the distance between the two outer edges. Thanks to this arrangement of the suction points 151a, 151b in the vicinity of the outer edges of the lubricant sump 15, it is assured that lubricant will constantly be present at least at one of the two suction points 151a, 151b, even when transverse accelerations are acting on the motor unit 1. This ensures that the lubricant pump 14 at all times takes in lubricant and accordingly can deliver it through its outlet to the transmission 12 and to the electric motor 11.

Of course, it is possible to arrange more than two suction points 151a, 151b at different positions on or in the lubricant sump 15. Beneath the transmission 12 in the embodiment shown there is situated a lubricant shell 16, which catches and collects lubricant from the transmission 12. The lubricant sump 15 is arranged above the lubricant shell 16 in the vertical direction. For this reason, the lubricant does not flow by gravity from the lubricant shell 16 and back to the lubricant sump 15. In order to take the lubricant from the lubricant shell 16 back to the lubricant sump 15 and thus bring it back into the lubricant circuit, at least one transmission gear 121 is arranged such that it dips into the lubricant in the lubricant shell 16 and delivers the lubricant during use to the lubricant sump 15 by its rotary motion. The teeth of this transmission gear 121 act like scoops and lift the lubricant out from the lubricant shell 16 and into the lubricant sump 15. Thanks to this delivery of the lubricant by the transmission gear 121, it is not necessary to provide an additional suction point 151a, 151b on the transmission and the lubricant shell 16. In this way, the motor unit 1 takes on a compact design and has fewer components than the prior art.

Figure 2:
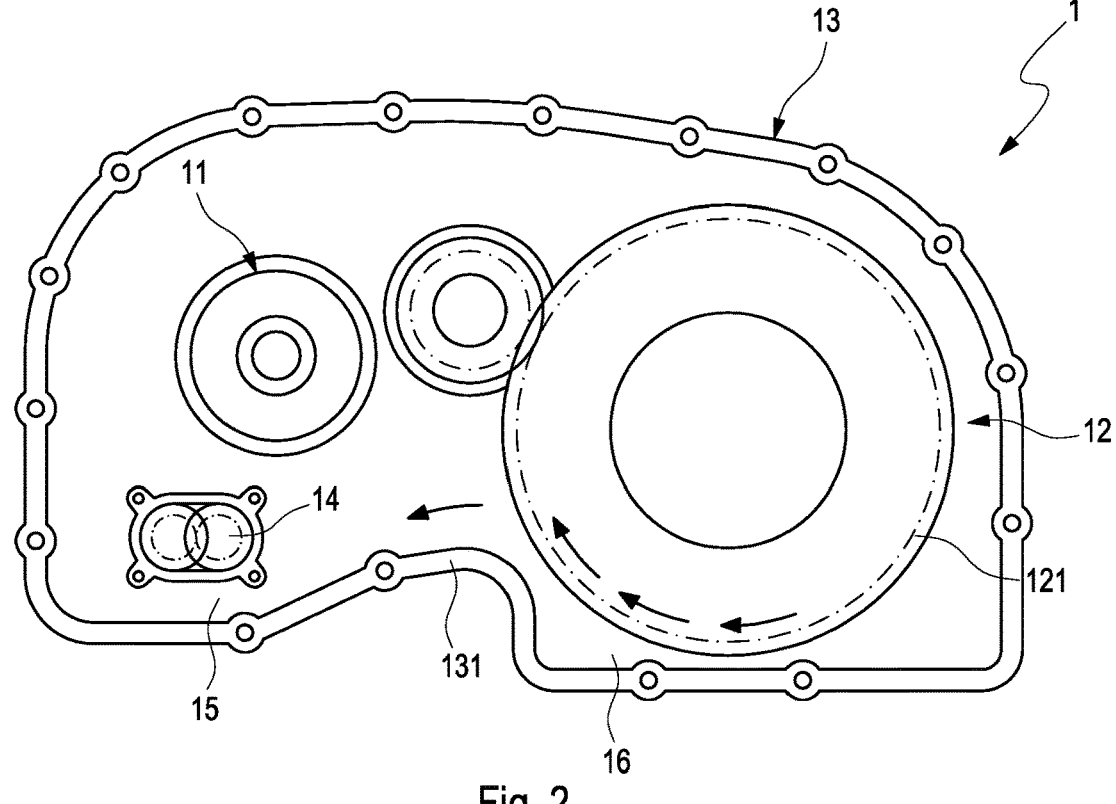
FIG. 2 shows in a sectional view, an embodiment of the motor unit described herein installed in a motor vehicle.

FIG. 2 shows in a sectional view an embodiment of the motor unit 1 installed in a motor vehicle (not shown). In FIG. 2, one sees an embodiment of a motor unit 1 with a more detailed design than the embodiment in the schematic view of FIG. 1. For basic, functional relationships, also refer to the description for FIG. 1. The embodiment represented in FIG. 2 is designed as the rear axle of a motor vehicle with electric drive. The common housing 13 surrounds the electric motor 11, situated here on the left side, and the transmission 12, situated on the right side. On the left side beneath the electric motor 11 is arranged the lubricant sump 15. On the right side beneath the transmission 12 is arranged a lubricant shell 16. A protrusion 131 is located in the horizontal direction between the lubricant sump 15 and the Lubricant shell 16, which extends beyond the lubricant level in the lubricant sump 15 in the vertical direction. This protrusion 131 must be overcome when delivering lubricant from the lubricant shell 16 to the lubricant sump 15 by the transmission gear 121. The transport of the lubricant is symbolized by small arrows. The transmission gear 121 delivers the lubricant from the lubricant shell 16, which adheres temporarily to the teeth during the rotation of the transmission gear 121 and is thus transported in the direction of the lubricant sump 15. At least one lubricant guiding element can be provided for specific guidance of the lubricant. Such a lubricant guiding element can be formed, for example, by a specially shaped partial region of the housing 13 or by an inserted baffle plate. In the embodiment shown, the lubricant pump 14 is situated inside the housing 13. The lubricant pump 14 here is designed as an external gear pump with two gears. Such an external gear pump is simple to build and it has two inlets and one outlet. Each of the two gears takes in lubricant from one inlet of the lubricant pump 14. Alternatively, the lubricant pump 14 may also be arranged outside the housing 13 or be formed by another type of pump, such as a vane pump.

German patent application no. 10 2022 117957.5, filed Jul. 19, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A motor unit, comprising:
   an electric motor and a transmission, which are mechanically joined together and arranged in a housing;
   a lubricant circuit, which lubricates the electric motor and the transmission;
   a lubricant pump having an outlet and at least two inlets for lubricant, wherein the outlet is connected by conduits to the electric motor and the transmission;
   a lubricant sump, which stores gathered lubricant and is arranged beneath the electric motor and/or the transmission in the housing during use, wherein the lubricant sump has at least two suction points separated from each other in a horizontal direction, and wherein each of the suction points is connected by a respective conduit to a respective one of the at least two inlets of the lubricant pump; and
   a lubricant shell, which is arranged beneath the transmission during use and catches lubricant from the transmission, wherein the transmission comprises at least one transmission gear which dips partly into the lubricant caught in the lubricant shell, wherein teeth of the at least one transmission gear lift lubricant out from the lubricant shell and deliver lubricant directly to the lubricant sump during use, wherein the lubricant sump is situated above the lubricant shell in the vertical direction.

2. The motor unit according to claim 1, wherein a protrusion is arranged between the lubricant sump and the lubricant shell, which extends beyond the lubricant level in the lubricant sump in the vertical direction during use.

3. The motor unit according to claim 1, wherein at least one lubricant guiding element is provided in the housing adjacent to the transmission gear, guiding the lubricant flow from the transmission gear to the lubricant sump.

4. The motor unit according to claim 1, wherein the lubricant pump is configured as an external gear pump, wherein two gears are provided, each of which suctions lubricant from a respective one of the at least two inlets of the lubricant pump.

5. The motor unit according to claim 1, wherein the lubricant sump has larger dimensions during use in the horizontal direction than in a vertical direction, wherein a length and a width of the lubricant sump in the horizontal direction is larger by at least a factor of 8 than a height in the vertical direction, and the suction points are situated respectively in the horizontal direction at a distance from an outer edge of the lubricant sump corresponding to as much as 20% of the distance between two opposite outer edges in the horizontal direction.

6. The motor unit according to claim 1, wherein a heat exchanger is arranged between the lubricant pump and the transmission and/or spray rings delivering lubricant to the electric motor are arranged next to the electric motor in the housing.

7. The motor unit according to claim 1, wherein at least the electric motor has a coolant circuit different from the lubricant circuit.

8. A method for the circulation of lubricant in a motor unit having: an electric motor and a transmission, which are mechanically joined together and arranged in a housing; a lubricant circuit, which lubricates the electric motor and the transmission; a lubricant pump having an outlet and at least two inlets for lubricant, wherein the outlet is connected by conduits to the electric motor and the transmission; a lubricant sump, which stores gathered lubricant and is arranged beneath the electric motor and/or the transmission in the housing during use, wherein the lubricant sump has at least two suction points separated from each other in a horizontal direction, and wherein each of the suction points is connected by a respective conduit to a respective one of the at least two inlets of the lubricant pump; and a lubricant shell, which is arranged beneath the transmission during use and catches lubricant from the transmission, wherein the transmission comprises at least one transmission gear which dips partly into the lubricant caught in the lubricant shell, wherein teeth of the transmission gear lift lubricant out from the lubricant shell and deliver lubricant directly to the lubricant sump during use, wherein the lubricant sump is situated above the lubricant shell in the vertical direction, the method comprising:

suctioning of lubricant from the lubricant sump, wherein the lubricant is suctioned from both suction points or from only one suction point by the lubricant pump, wherein the number of suction points used depends on the transverse acceleration acting on the lubricant during use;

transporting of the lubricant by the lubricant pump to the transmission and to the electric motor through the conduits connected to the transmission and to the electric motor; and conducting of the lubricant by gravity and/or centrifugal force through the transmission and the electric motor, the lubricant being caught in the lubricant sump after the lubricant passes through.

\* \* \* \* \*